United States Patent

Mathers et al.

[15] 3,637,517

[45] Jan. 25, 1972

[54] PROCESS FOR PRODUCING PHOSPHORS

[72] Inventors: James E. Mathers, Ulster; Felix F. Mikus, Towanda, both of Pa.

[73] Assignee: Sylvania Electric Products Inc.

[22] Filed: Jan. 15, 1970

[21] Appl. No.: 3,236

[52] U.S. Cl. .............................252/301.4 R, 23/22, 23/23, 23/328, 252/301.1, 252/301.4 S
[51] Int. Cl. .........................................C09k 1/10, C09k 1/14
[58] Field of Search ......................252/301.4, 301.4 S, 301.1; 23/22, 23, 328

[56] References Cited

UNITED STATES PATENTS

| | | | |
|---|---|---|---|
| 3,474,040 | 10/1969 | Hedler et al. | 252/301.4 R |
| 3,506,585 | 4/1970 | Otsuka et al. | 252/301.4 R |
| 3,523,904 | 8/1970 | Single | 252/301.4 R |

Primary Examiner—Robert D. Edmonds
Attorney—Norman J. O'Malley, Donald R. Castle and William H. McNeill

[57] ABSTRACT

A process for producing an ultrapure rare earth oxide phosphor from partially purified raw materials is disclosed that comprises forming an acidic aqueous solution comprising water, a mineral acid, europium and a second rare earth element selected from the group consisting of yttrium, gadolinium and mixtures thereof having a relatively minute amount of an impurity selected from the group consisting of cerium, thorium and mixtures thereof, maintaining the solution under controlled pH and temperature condition, adding to the solution a controlled amount of a water-soluble persulfate source to thereby form a solid and liquid phase, separating the phases and adding oxalic acid to the liquid phase to form a rare earth oxalate and converting the oxalate to the corresponding rare earth phosphor selected from the group consisting of rare earth oxides and rare earth oxysulfides.

6 Claims, No Drawings

PROCESS FOR PRODUCING PHOSPHORS

BACKGROUND OF THE INVENTION

This invention relates to ultra pure phosphors particularly suited to cathode ray tubes. More particularly it relates to the production of certain rare earth phosphors.

The brightness of the emission is one of the important properties of cathodoluminescent phosphors particularly if the material is used in color television. It has been known that impurities such as cerium, thorium and other rare earths tend to lower the brightness of the emission. To remove a major portion of these impurities ion exchange or solvent extraction methods are used. These methods remove nearly all of the undesired rare earth impurities to a level generally below about 50 p.p.m. Additional purification is desirable that will reduce the cerium content to 5 p.p.m. or less and the thorium content to 10 p.p.m. or less.

It is believed, therefore, that a process whereby the cerium and thorium level is reduced to the above-mentioned desired levels in a relatively simple manner would be an advancement in the art.

SUMMARY OF THE INVENTION

In accordance with one aspect of this invention, there is provided a process for producing ultra pure rare earth oxide phosphors from partially purified raw materials comprising (1) forming an acidic aqueous solution comprising water, a mineral acid, europium and a second rare earth element selected from the group consisting of yttrium, gadolinium and mixtures thereof having an impurity element selected from the group consisting of cerium, thorium and mixtures thereof, (2) controlling the temperature and pH (3) adding to said solution a controlled amount of a water soluble persulfate source to form a solid and liquid phase, (4) separating the phases, (5) adding at least a stoichiometric amount of oxalic acid to form solid rare earth oxalates and (6) converting the oxalates to the corresponding rare earth phosphors selected from the group consisting of rare earth oxides and rare earth oxysulfides.

For a better understanding of the present invention, together with other and further objects, advantages, and capabilities thereof, reference is made to the following disclosure and appended claims.

DESCRIPTION OF THE PREFERRED EMBODIMENTS

As previously mentioned, conventional purification methods used in the production of rare earth raw materials, e.g., ion exchange or solvent extraction are generally unsuccessful in removing all of the impurities. Relatively minute amounts of certain impurities have been found to deaden the brightness of certain rare earth phosphors particularly rare earth oxides and oxysulfides. The impurities that have a high level of adverse effects upon the brightness of rare earth oxide phosphors are those selected from the group consisting of cerium, thorium and mixtures thereof. The process of this invention is successful in purifying rare earth raw materials to achieve levels of less than 5 p.p.m. of cerium and less than 10 p.p.m. For purposes of brevity as used herein, the term "ultrapure" means that the levels of cerium and thorium are below 5 p.p.m. and 10 p.p.m. respectively. A "nonultrapure" material is one that contains cerium and thorium at levels above the "ultrapure" level.

The first step in the process of this invention to produce an ultrapure rare earth oxide phosphor is to form an acidic aqueous solution comprising water, a mineral acid, europium and a raw material source containing an element selected from the group consisting of yttrium, gadolinium and mixtures thereof and as an impurity an element selected from the group consisting of cerium, thorium and mixtures thereof.

One of the sources of raw materials is the yttrium vanadate phosphor. In this phosphor brightness is not as adversely effected by minute amounts of cerium and thorium as are the oxide phosphors that are currently in use. Thus in reclaiming the rare earth values from such phosphors by converting them to rare earth oxides, the process of this invention is advantageously employed to produce an ultra pure rare earth oxide phosphor.

Other sources of raw materials can be used. That is, any nonultrapure raw material source that contains the desired elements selected from the group consisting of yttrium, gadolinium and mixtures thereof and having impurities selected from the group consisting of cerium, thorium and mixtures is suitable for the practice of this invention. It is generally desirable that some purification of the raw material source has occurred thus to eliminate several treatments it is preferred that in the raw material source that conventional purification techniques be used to purify the raw material source to the extent that cerium, if present, is below about 50 p.p.m. and thorium, if present, is below about 100 p.p.m.

The nonultrapure raw material source is dissolved in an aqueous mineral acid solution such as nitric acid or hydrochloric acid. Generally, acid solutions having a concentration of about 8 to about 13 moles per liter are used. In most instances, excess amounts of acid are not used, that is, the minimum amount of acid is used that will form a solution containing the raw material source. Excess acid does not increase the efficiency and requires more base to raise the pH to the desired level, therefore, use of excess acid is avoided. Use of insufficient acid to dissolve all of the raw materials results in the inherent loss of relatively expensive rare earth values, therefore, is also avoided.

After the acidic aqueous solution is formed the pH is controlled at from about 4.5 to about 5.1. Since the solution containing the rare earths and impurities is more acidic than desired, the addition of a basic solution to raise the pH to the above pH range is generally necessary. Suitable basic solutions include ammonium carbonate, alkali metal carbonates, and other basic salts that are generally considered to be weak basic salts, that is, those having a pH of below about 10.

It is also necessary to control the temperature to at least about 90° C. Any temperature that is from about 90° C. to about the boiling point of the solution can be used. It is generally preferred, however, to control the temperature between about 90° C. and 100° C.

After the pH and temperature are within the desired range, a sufficient amount of a water soluble persulfate source is added to yield an ionic ratio of persulfate ion to the rare earth ions present and will later form the host materials of from about 1:10 to about 1:50 with from about 1:25 to about 1:35 being preferred. The rare earth ions present are selected from the group consisting of yttrium, gadolinium and mixtures thereof. Water soluble salts of peroxydisulfuric acid, $H_2S_2O_8$, can be used as a persulfate source, however, because of its solubility characteristics, persulfate, also known as ammonium $(NH_4)_2S_2O_8$, is the preferred source.

After the persulfate source is added, the temperature of the solution is to be held at at least about 90° C. for at least about 5 minutes to form a two-phase system having a solid and a liquid phase. The solid phase contains the impurities, that is, either cerium, thorium or both while the liquid phase contains ultrapure rare earths selected from yttrium, gadolinium and mixtures thereof. It is to be noted that since europium is generally the desired activator for the subsequently produced phosphors that the activator source is preferably present so that it can also be purified and any cerium or thorium that is present therein can also be removed. If desired, however, the activator source, generally europium, can be added to the liquid phase.

The two phases are separated by generally accepted techniques for solid and liquid separation such as filtration, centrifugation, settling and decantation and the like. The separation is preferably carried out while the solution is at least 90° C. to minimize the tendency for any of the desired rare earths to precipitate.

After separation at least a stoichiometric equivalent amount of oxalic acid based upon the rare earth content of the liquid phase is added to the liquid phase to thereby form solid rare earth oxalates. The solid rare earth oxalates can be recovered by separating them from the remaining liquid, generally by filtration. The oxalates are generally washed with water or preferably an aqueous solution of oxalic acid then dried to remove the residual moisture. The ultrapure rare earth oxalates are then heated to a temperature of from about 800° to about 1,250° C. for at least about 30 minutes to thereby convert the oxalates to the corresponding rare earth phosphors selected from the group consisting of rare earth oxides and rare earth oxysulfides. Thus, there is prepared ultrapure yttrium, gadolinium and mixed yttrium-gadolinium phosphors that can be either the oxides or the oxysulfides. In most instances, the activator will be europium, however, this invention is not so limited.

To more fully illustrate the subject invention, the following detailed examples are presented. All parts, proportions, percentages are by weight unless otherwise indicated.

EXAMPLE I

About 450 parts of europium activated yttrium orthovanadate phosphor containing about 50 p.p.m. cerium and 100 p.p.m. of thorium are dissolved in about 850 parts of 15.6N hydrochloric acid. The vanadium is separated by filtartion as the vanadium forms an insoluble vanadium pentoxide. After the vanadium separation ammonium carbonate is added to the solution containing the europium and yttrium to adjust the pH to about 4.7. The solution is then heated to about 90° C. and about 12 parts of ammonium persulfate are added to the heated solution. The solution is held at 90° C. for about 10 minutes and is thereafter filtered to remove the solids. About 500 parts of oxalic acid are added to the filtrate. About 500 parts of solid rare earth oxalates are formed and recovered by filtration. The solids are washed with about 1,000 parts of an aqueous solution of oxalic acid having an oxalic acid concentration of about 10 grams of oxalic acid per liter of solution. The oxalates are dried by hot air at 120° C. to remove any residual moisture and then heated to about 1,250° C. to convert the oxalates into rare earth oxide phosphors. The brightness of the resulting phosphor is about 185 percent as compared with about 145 percent of a phosphor prepared in the same manner without the persulfate reaction step with both phosphors compared to a (ZnCd)S:Ag red-emitting phosphor taken as 100 percent.

EXAMPLE II

About 100 parts of gadolinium oxide and about 5 parts of europium oxide having a cerium level of about 50 p.p.m. and about 100 p.p.m. of thorium are dissolved in about 200 parts of 12N hydrochloric acid. The pH is adjusted to about 4.8 with ammonium carbonate. The solution is heated to about 90° C. About 3 parts of ammonium persulfate are added to the heated solution. The solution is held at above about 90° C. for about 10 minutes and is thereafter filtered to remove the solids. About separated by filtration as the parts of oxalic acid are added to the filtrate. Solid rare earth oxalates are formed and recovered by filtration. The solids are washed with about 250 parts of an aqueous solution of oxalic acid having a concentration of about 10 grams of oxalic acid per liter of solution. An analysis of the oxalates recovered indicate that substantially all of the gadolinium and europium are recovered. The oxalates are dried and heated at above 950° C. to convert the oxalates into a red-emitting cathodoluminescent phosphor. The brightness of the phosphor is about 180 percent as compared to about 150 percent for a material produced without the benefits of this invention. The standard is a red-emitting (ZnCd)S:Ag phosphor taken as 100 percent.

EXAMPLE III

Ultrapure red-emitting europium-activated yttrium oxysulfide phosphors are prepared from a partially purified raw material containing about 50 p.p.m. of cerium and 100 p.p.m. of thorium by following the dissolution in nitric acid, pH adjustment, addition of ammonium persulfate, separation of the solids and liquids, oxalic acid addition, separation of solids, washing with oxalic acid as in examples 1 and 11. The yttrium-europium oxides thus formed are then converted to oxysulfides by methods well known in the art such as disclosed in U.S. Pat. No. 3,418,246. The resulting phosphor is over 20 percent brighter than a similar phosphor produced in a similar manner but without the persulfate addition step.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for producing ultrapure phosphors from a nonultra pure raw material source having impurities selected from group consisting of cerium, thorium, and mixtures thereof comprising:
    a. forming an acidic aqueous solution comprising water, a mineral acid, europium and an element selected from the group consisting of yttrium, gadolinium and mixtures thereof,
    b. controlling the pH of said solution at from about 4.5 to about 5.0,
    c. controlling the temperature of said solution at at least about 90° C,
    d. adding a sufficient amount of a water-soluble persulfate source to yield an ionic ratio of persulfate to the rare earth ions that are present and are selected from the group consisting of yttrium, gadolinium and mixtures thereof of from about 1:10 to about 1:50,
    e. controlling the temperature of said solution at at least about 90° C. for at least about 5 minutes to form solid and liquid phases wherein said impurities are in said solid phase,
    f. separating said phases,
    g. adding to the liquid phase at least a stoichiometric amount of oxalic acid based upon the rare earth content of said liquid phase to form solid rare earth oxalates,
    h. recovering said solid rare earth oxalates, and
    i. converting said rare earth oxalate to europium-activated rare earth phosphors selected from the group consisting of europium-activated rare earth oxides and europium-activated rare earth oxysulfide phosphors.

2. A process according to claim 1 wherein said persulfate source is ammonium persulfate, $(NH_4)_2S_2O_8$.

3. A process according to claim 2 wherein said nonultrapure raw material source is europium-activated yttrium orthovanadate.

4. A process according to claim 2 wherein said ultrapure rare earth phosphor is europium-activated yttrium oxide.

5. A process according to claim 2 wherein said ultrapure rare earth phosphor is europium-activated gadolinium oxide.

6. A process according to claim 2 wherein said ultrapure rare earth phosphor is europium-activated yttrium oxysulfide.

* * * * *

O-1050
5/69)

UNITED STATES PATENT OFFICE
CERTIFICATE OF CORRECTION

Patent No. 3,637,517     Dated January 25, 1972

Inventor(s) James E. Mathers and Felix F. Mikus

It is certified that error appears in the above-identified patent and that said Letters Patent are hereby corrected as shown below:

Col. 3, Example 2, Line 56 per specification "About separated by filtration as the" - - should read - -

About 110 - - . (separated by filtration as the --- should be deleted)

Signed and sealed this 15th day of August 1972.

(SEAL)
Attest:

EDWARD M. FLETCHER, JR.
Attesting Officer

ROBERT GOTTSCHALK
Commissioner of Patents